(12) United States Patent
Gong et al.

(10) Patent No.: US 8,529,244 B2
(45) Date of Patent: Sep. 10, 2013

(54) INJECTION MOLD

(75) Inventors: Wen-Peng Gong, New Taipei (TW);
Xiao-Ping Wu, New Taipei (TW);
Kun-Hsueh Chiang, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 352 days.

(21) Appl. No.: 13/089,291

(22) Filed: Apr. 18, 2011

(65) Prior Publication Data

US 2012/0263821 A1    Oct. 18, 2012

(51) Int. Cl.
*B29C 45/44* (2006.01)

(52) U.S. Cl.
USPC .............. 425/556; 425/441; 425/DIG. 58

(58) Field of Classification Search
USPC .......... 425/436 R, 441, 556, DIG. 5, DIG. 58
See application file for complete search history.

(56) References Cited

U.S. PATENT DOCUMENTS

| | | | | |
|---|---|---|---|---|
| 3,516,302 A * | 6/1970 | Muttart | ............................ | 249/67 |
| 3,811,645 A * | 5/1974 | Feist | ................................ | 249/68 |
| 4,082,245 A * | 4/1978 | Santos | ............................ | 249/68 |
| 4,765,585 A * | 8/1988 | Wieder | ............................ | 249/64 |
| 5,378,422 A * | 1/1995 | Musiel et al. | ................. | 264/238 |
| 6,126,429 A * | 10/2000 | Burger et al. | ................. | 425/169 |
| 6,474,977 B1 * | 11/2002 | Wimmer | ........................ | 425/556 |
| 6,537,053 B1 * | 3/2003 | Watkins | ........................ | 425/190 |
| 6,609,903 B2 * | 8/2003 | Kurimoto | ....................... | 425/556 |
| 7,387,505 B1 * | 6/2008 | Chen et al. | ..................... | 425/190 |
| 8,342,838 B2 * | 1/2013 | Wu et al. | ........................ | 425/556 |
| 8,371,843 B2 * | 2/2013 | Wang et al. | .................... | 425/556 |
| 2012/0177774 A1 * | 7/2012 | Kaufman et al. | ............. | 425/556 |

FOREIGN PATENT DOCUMENTS

| | | | |
|---|---|---|---|
| JP | 408267467 A | * | 10/1996 |
| JP | 02001096540 A | * | 4/2001 |

* cited by examiner

*Primary Examiner* — Yogendra Gupta
*Assistant Examiner* — Emmanuel S Luk

(57) ABSTRACT

An injection mold for molding a product having at least one bar formed at one side thereof. The injection mold includes a stationary mold including an inclined pillar and a movable mold including a movable core and a sliding block mounted on a top thereof. The inclined pillar inserted in the sliding block to drive the sliding block to slide towards or away from the movable core. A shaping cavity for molding the product is formed among the movable core, the sliding block and the stationary mold. The end surface of the sliding block further defines at least one shaping groove connected with the shaping cavity for molding the bar. The movable mold further includes an ejector pin and a maintaining pillar. The maintaining pillar resists against a bottom of the sliding block to avoid the ejector pin moving upward before the bar completely parted from the shaping groove.

4 Claims, 2 Drawing Sheets

US 8,529,244 B2

INJECTION MOLD

BACKGROUND OF THE INVENTION

1. Field of the Invention

The present invention generally relates to an injection mold, and more particularly to an injection mold capable of ejecting a product out effectively.

2. The Related Art

Generally, a conventional injection mold for molding a product having two bars protruding sideward from one side thereof includes a stationary mold and a movable mold. The movable mold includes a movable plate, an ejector pin fixing plate, an ejector pin, a movable core mounted in a middle of a top of the movable plate, and a sliding block mounted on one side of the top of the movable plate. The sliding block defines an inserting perforation extending slantwise in one end thereof, and two grooves at the other end thereof and apart facing the movable core. A bottom end of the ejector pin is fastened to the ejector pin fixing plate, and a top end of the ejector pin can movably penetrate through the movable plate and the movable core. An inclined pillar is mounted to a bottom of the stationary mold. When the injection mold is closed, the inclined pillar is inserted in the inserting perforation of the sliding block. The top end of the ejector pin is in alignment with a top surface of the movable core. A shaping cavity for molding the product is formed among the stationary mold, the movable core and the sliding block, and the grooves are connected with the shaping cavity. When the injection mold is opened, the inclined pillar moves upward along the inserting perforation to drive the sliding block to slide sideward and away from the movable core so as to make the bars of the product parted from the grooves of the sliding block. Then the ejector pin moves upward to eject the product out of the movable mold.

However, in some conditions, before the sliding block is parted from the two bars of the product completely, the ejector pin fixing plate has already begun driving the ejector pin upward to eject the product out of the movable mold. As a result, the bars of the product are apt to be broken so that causes a low production of the product.

SUMMARY OF THE INVENTION

An object of the present invention is to provide an injection mold for molding a product having at least one bar formed at one side thereof. The injection mold includes a stationary mold and a movable mold. A bottom of the stationary mold is concaved upward to form a groove. The stationary mold includes an inclined pillar slantwise mounted in the stationary mold with a bottom end thereof stretching under the stationary mold. The movable mold is positioned under the stationary mold when the injection mold is closed. The movable mold defines a space at a bottom thereof, and includes an ejector pin plate movably disposed in the space. A movable core and a sliding block are mounted on a top of the movable mold. The sliding block defines an inserting perforation extending slantwise to penetrate therethrough for receiving the bottom end of the inclined pillar therein so as to drive the sliding block to slide towards or away from the movable core during the injection mold is closed or opened. The movable core is received in the groove and spaced from an inner periphery of the groove and an end surface of the sliding block to together define a shaping cavity for molding the product. The end surface of the sliding block further defines at least one shaping groove connected with the shaping cavity for molding the bar at the one side of the product. The movable mold further includes an ejector pin and a maintaining pillar of which bottom ends are fastened to the ejector pin plate and top ends penetrate through the movable mold. The top end of the maintaining pillar resists against a bottom of the sliding block to ensure the top end of the ejector pin in alignment with a top surface of the movable core when the injection mold is closed, and further avoid the ejector pin plate and the ejector pin moving upward before the sliding block slides away from the movable core under the action of the inclined pillar to make the bar completely parted from the shaping groove.

As described above, the injection mold utilizes the maintaining pillar to always resist against the bottom of the sliding block during the bars being parted from the shaping grooves to prevent the ejector pin plate moving upward so as to avoid the ejector pin moving upward. So it effectively avoids the bars being broken off the product and further assures the production of the product.

BRIEF DESCRIPTION OF THE DRAWINGS

The present invention will be apparent to those skilled in the art by reading the following description, with reference to the attached drawings, in which.

DETAILED DESCRIPTION OF THE EMBODIMENT

Figure 1:
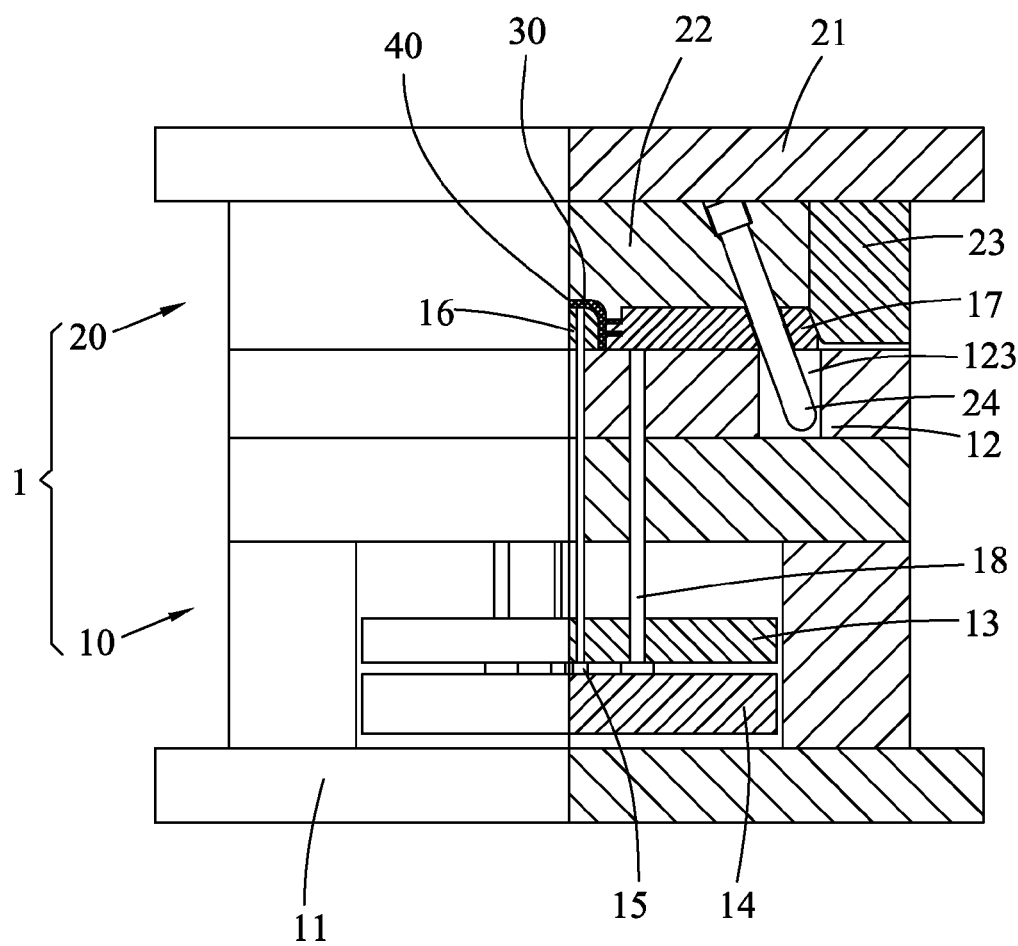
FIG. 1 is a cross-sectional view of an injection mold according to the present invention, wherein the injection mold is closed with a product being molded therein.

Referring to FIG. 1, an embodiment of an injection mold 1 according to the present invention is shown. The injection mold 1 adapted for molding a product 30 includes a movable mold 10 and a stationary mold 20 positioned over the movable mold 10.

Figure 2:
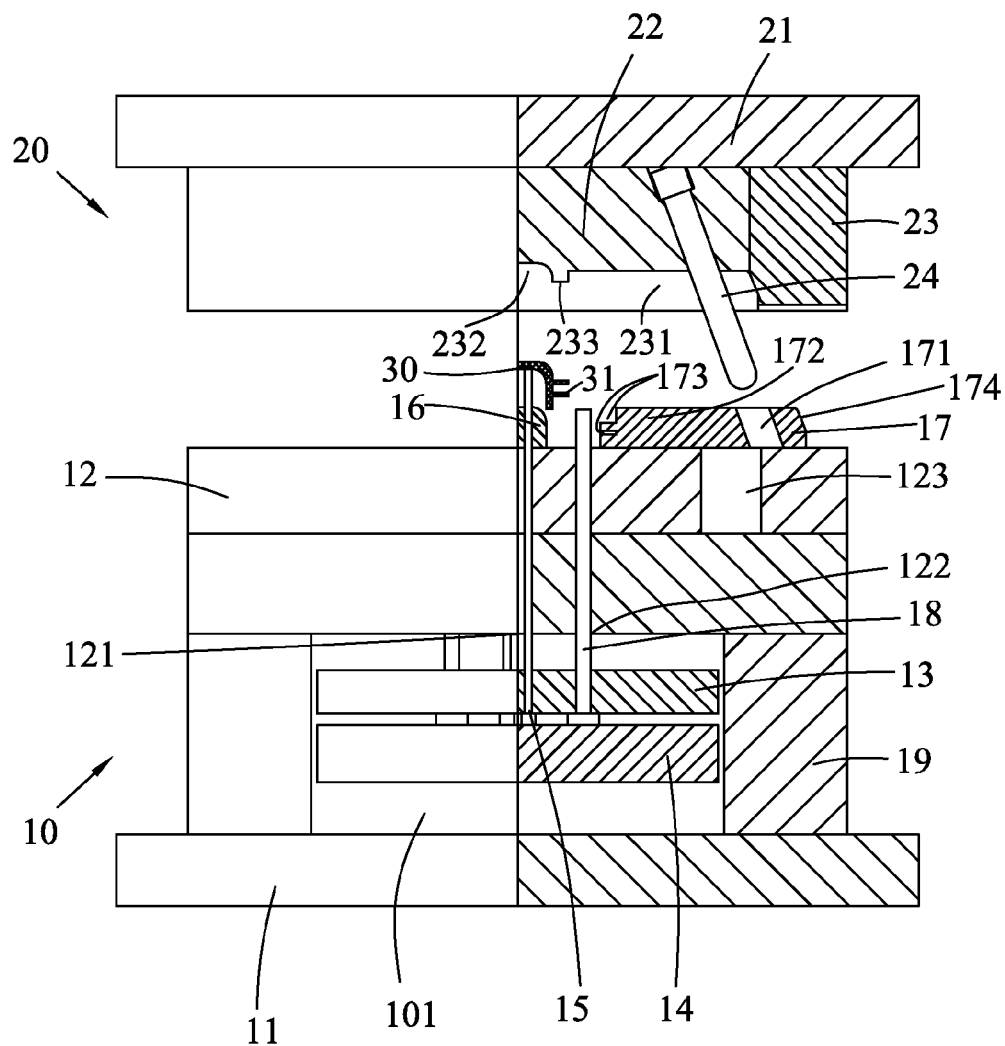
FIG. 2 is another cross-sectional view of the injection mold of FIG. 1, wherein the injection mold is opened with the product being ejected out therefrom.

Referring to FIGS. 1-2, the movable mold 10 includes a movable fixing plate 11, a movable plate 12, an ejector pin plate 13, an ejector pin fixing plate 14, an ejector pin 15, a movable core 16 mounted on a top of the movable plate 12, a sliding block 17, a maintaining pillar 18 and two support blocks 19. The movable fixing plate 11 is disposed levelly. The two support blocks 19 are mounted on two opposite sides of a top of the movable fixing plate 11 and spaced from each other. The movable plate 12 is mounted on tops of the two support blocks 19. A space 101 is formed among the movable fixing plate 11, the two support blocks 19 and the movable plate 12. The ejector pin fixing plate 14 is located in the space 101 and above the movable fixing plate 11. The ejector pin plate 13 is mounted above the ejector pin fixing plate 14. The ejector pin fixing plate 14 and the ejector pin plate 13 can together move upward and downward in the space 101. The movable plate 12 defines an ejector pin hole 121 vertically penetrating through the movable plate 12 and the movable core 16 for receiving a top end of the ejector pin 15, and a maintaining hole 122 vertically penetrating through the movable plate 12 and away from the movable core 16 for receiving a top end of the maintaining pillar 18. A top of the movable plate 12 defines a receiving groove 123. The sliding block 17 is slidably mounted on a top surface of the movable plate 12 to move towards or away from the movable core 16. The sliding block 17 has a base portion 172 of substantial rectangular shape. One end surface of the base portion 172 facing the movable core 16 defines two shaping grooves 173 spaced from each other. The other end of the base portion 172 defines an inserting perforation 171 extending slantwise to penetrate therethrough, wherein the inserting perforation 171 is gradually inclined away from the movable core 16 from top to bottom. A top corner of the sliding block 17 opposite to the shaping grooves 173 is cut off to define an abutting surface 174.

Referring to FIGS. 1-2, the stationary mold 20 includes a stationary fixing plate 21, a stationary core 22, a pressing block 23 and an inclined pillar 24. The stationary core 22 and the pressing block 23 are fastened under the stationary fixing plate 21, with the pressing block 23 abutting against one side of the stationary core 22. A bottom of the stationary core 22 is concaved upward to form a first groove 231 adjacent to the pressing block 23, and a second groove 232 facing to the movable core 16 and adjacent to the first groove 231. A bottom of the first groove 231 is connected with a bottom of the second groove 232, and a protrusion 233 is blocked between tops of the first groove 231 and the second groove 232. The inclined pillar 24 is slantwise mounted in the stationary core 22 with a lower portion thereof passing through the first groove 231 to stretch under the stationary mold 20. The stationary mold 20 defines a sprue channel (not shown).

Referring to FIGS. 1-2, bottom ends of the ejector pin 15 and the maintaining pillar 18 are fastened to the ejector pin plate 13 and the ejector pin fixing plate 14, and top ends of the ejector pin 15 and the maintaining pillar 18 penetrate through the ejector pin plate 13 to be movably inserted in the ejector pin hole 121 and the maintaining hole 122, respectively. The ejector pin plate 13 and the ejector pin fixing plate 14 can move upward and downward with respect to the movable fixing plate 11 in the space 101 to drive the ejector pin 15 and the maintaining pillar 18 to move up and down along the ejector pin hole 121 and the maintaining hole 122, respectively.

Referring to FIGS. 1-2, when the injection mold 1 is closed, the stationary mold 20 moves downward to make the lower portion of the inclined pillar 24 inserted into the inserting perforation 171 of the sliding block 17 so as to drive the sliding block 17 to slide towards the movable core 16, until the sliding block 17 is received in the first groove 231 with the abutting surface 174 abutting against the pressing block 23 and the protrusion 233 inserted in the upper shaping groove 173 and spaced from a bottom side of the upper shaping groove 173. At this time, the movable core 16 is received in the second groove 232 and a bottom end of the inclined pillar 24 is inserted in the receiving groove 123. The ejector pin plate 13 and the ejector pin fixing plate 14 drive the ejector pin 15 and the maintaining pillar 18 to move upward to make the ejector pin 15 be in alignment with a top surface of the movable core 16 and the top end of the maintaining pillar 18 propping against a bottom of the base portion 172. An outer surface of the movable core 16 is spaced from an inner periphery of the second groove 232, the protrusion 233 and the end surface of the base portion 172 to together define a shaping cavity 40 thereamong communicating with the sprue channel. The shaping grooves 173 are connected with the shaping cavity 40. Then thermoplastic resins are injected into the shaping cavity 40 of the injection mold 1 through the sprue channel and further flow into the shaping grooves 173. The thermoplastic resins are solidified for a predetermined time to form the product 30 which has two elongated bars 31 molded in the shaping grooves 173 and formed at an outer side surface of the product 30.

Referring to FIGS. 1-2, when the injection mold 1 is opened, the stationary mold 20 moves upward. The sliding block 17 slides away from the movable core 16 under the action of the inclined pillar 24 to make the two bars 31 of the product 30 parted from the shaping grooves 173 of the sliding block 17. Before the two bars 31 of the product 30 are parted from the shaping grooves 173, the top end of the maintaining pillar 18 always resists against the bottom of the sliding block 17 to prevent the ejector pin plate 13 and the ejector pin fixing plate 14 moving upward so as to avoid the ejector pin 15 moving upward, so it further avoids the bars 31 being broken off the product 30. After the bars 31 are completely parted from the sliding block 17 and the top end of the maintaining pillar 18 is set free from the sliding block 17, the ejector pin plate 13 and the ejector pin fixing plate 14 are pushed upward to drive the maintaining pillar 18 and the ejector pin 15 to move upward along the ejector pin hole 121 and the maintaining hole 122 so as to eject the product 30 out of the injection mold 1 effectively. So that ensures a production of the product 30.

As described above, the injection mold 1 utilizes the maintaining pillar 18 to always resist against the bottom of the sliding block 17 during the bars 31 being parted from the shaping grooves 173 to prevent the ejector pin plate 13 and the ejector pin fixing plate 14 moving upward so as to avoid the ejector pin 15 moving upward. So it effectively avoids the bars 31 being broken off the product 30 and further assures the production of the product 30.

What is claimed is:

1. An injection mold for molding a product having at least one bar formed at one side thereof, comprising:
   a stationary mold, a bottom of the stationary mold being concaved upward to form a groove, the stationary mold including an inclined pillar slantwise mounted in the stationary mold with a bottom end thereof stretching under the stationary mold; and
   a movable mold positioned under the stationary mold when the injection mold is closed, the movable mold defining a space at a bottom thereof, and including an ejector pin plate movably disposed in the space, a movable core and a sliding block being mounted on a top of the movable mold, the sliding block defining an inserting perforation extending slantwise to penetrate therethrough for receiving the bottom end of the inclined pillar therein so as to drive the sliding block to slide towards and away from the movable core, the movable core being received in the groove and spaced from an inner periphery of the groove and an end surface of the sliding block to together define a shaping cavity for molding the product, the end surface of the sliding block further defining at least one shaping groove connected with the shaping cavity for molding the bar at the one side of the product, the movable mold further including an ejector pin and a maintaining pillar of which bottom ends are fastened to the ejector pin plate and top ends penetrate through the movable mold,
   wherein the top end of the maintaining pillar resists against a bottom of the sliding block to ensure the top end of the ejector pin in alignment with a top surface of the movable core when the injection mold is closed, and further avoid the ejector pin plate and the ejector pin moving upward before the sliding block slides away from the movable core under the action of the inclined pillar to make the bar completely parted from the shaping groove.

2. The injection mold as claimed in claim 1, wherein a top of the movable mold defines a receiving groove under the sliding block, the bottom end of the inclined pillar is further inserted in the receiving groove through the inserting perforation when the injection mold is closed.

3. The injection mold as claimed in claim 1, wherein the bottom of the stationary mold further defines a first groove of which a bottom is connected with a bottom of the groove, a protrusion is blocked between tops of the first groove and the groove, the bottom end of the inclined pillar passes through the first groove to stretch under the stationary mold, the sliding block is received in the first groove and the protrusion is embedded in the sliding block when the injection mold is closed.

4. The injection mold as claimed in claim 3, wherein a top corner of the sliding block opposite to the shaping groove is cut off to define an abutting surface abutting against an inside of the first groove.

\* \* \* \* \*